United States Patent [19]
Harvey

[11] 3,838,525
[45] Oct. 1, 1974

[54] VISUAL TEACHING DEVICE
[76] Inventor: David A. Harvey, 125 High St., Boston, Mass. 02110
[22] Filed: Sept. 17, 1973
[21] Appl. No.: 398,154

[52] U.S. Cl. .................... 35/9 A, 353/51, 353/78
[51] Int. Cl. .................... G09b 7/08, G03b 21/28
[58] Field of Search ............ 35/9 R, 9 A, 9 B, 8 R, 35/35 B, 48 R; 353/50, 51, 77, 78, 73, 79

[56] References Cited
UNITED STATES PATENTS

| | | | |
|---|---|---|---|
| 1,954,787 | 4/1934 | Bright et al. | 353/78 |
| 2,197,306 | 4/1940 | Ingraham | 35/48 R |
| 2,252,726 | 8/1941 | Peck | 35/35 B |
| 2,266,798 | 12/1941 | Peck | 35/35 B |
| 2,746,345 | 5/1956 | Graves | 353/79 X |
| 2,851,922 | 9/1958 | Rosin | 353/78 X |
| 2,943,400 | 7/1960 | Griswold | 35/48 R X |
| 3,057,082 | 10/1962 | Wellington et al. | 35/48 R X |
| 3,079,838 | 3/1963 | Markwood | 353/78 X |
| 3,141,244 | 7/1964 | Smith | 35/9 A |
| 3,159,077 | 12/1964 | Hoag et al. | 353/78 X |
| 3,273,260 | 9/1966 | Walker | 35/9 A |
| 3,315,563 | 4/1967 | Harper et al. | 353/99 X |
| 3,472,587 | 10/1969 | Liguori | 353/35 |
| 3,516,176 | 6/1970 | Cleary et al. | 35/9 B |
| 3,532,419 | 10/1970 | Tanaka | 353/73 |
| 3,594,081 | 7/1971 | Tschink | 353/82 X |
| 3,728,801 | 4/1973 | Beckman et al. | 353/78 X |
| R23,030 | 8/1948 | Holt | 35/48 R |

Primary Examiner—Wm. H. Grieb
Attorney, Agent, or Firm—Richard P. Crowley

[57] ABSTRACT

A visual teaching device which comprises a first and second rotatable and a first fixed plane front surface mirrors which provide for the display at any time on a screen of a selected quadrant portion of an image from a projector.

15 Claims, 7 Drawing Figures

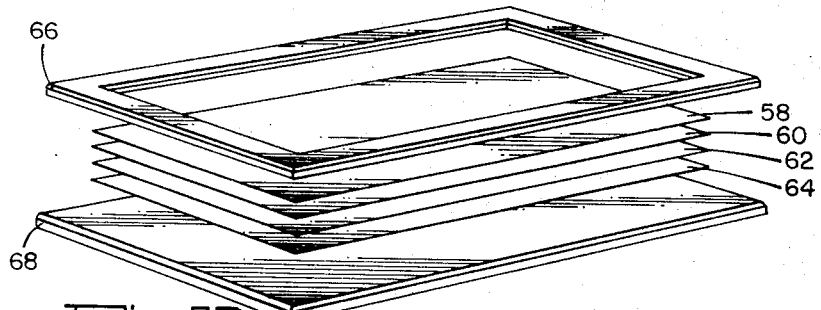
Fig. 5A.
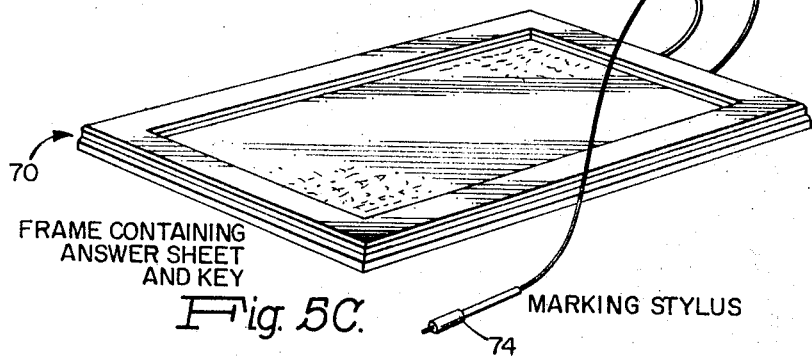
Fig. 5B.
Fig. 5C.

VISUAL TEACHING DEVICE

BACKGROUND OF THE INVENTION

Any device that aids in an instructional process is often referred to as a teaching machine. The oldest U.S. patent issued for such a device is that belonging to H. Chard, Feb. 16, 1809 (see Lumsdaine, A. A. and Robert Glaser, *Teaching Machines and Programmed Learning, A Source Book*, Washington: National Education Association, 1960). Today, there are hundreds of patents relating to teaching and education, but many of the older ones represent outmoded and now useless devices.

Modern interest in teaching devices as they are now conceived probably had its origin in the work of S. L. Pressey, who, around 1926, developed an automatic mechanical testing device. In this instance, and in the efforts of educational researchers that followed, there was an attempt to relate the operation of the teaching device to known theories of learning. The principle involved in Pressey's machine was to test a student (multiple-choice-type questions) and to provide immediate feedback to the student's responses, thus providing reinforcement of learning. Over a period of time, Pressey continued to work with such devices, and was able to show that they had value as instructional aids as well as testing.

It was not until World War II that interest in teaching machines was renewed, and various devices developed for military use. Up to this time, most of the machines involved presentation of material that was best dealt with by rote learning. With the advance of electronic technology, greater demands being made of our educational institutions, and greater knowledge of the learning process, interest in teaching machines in the post-war period has continued to rise. Much of the renewed interest in teaching machines was due to the experiments of B. F. Skinner. Programmed learning, apparently, naturally resulted from attempting to write material for machine presentation. Programmed learning is a system of presentation of material in small increments, requiring student interaction (usually overt) with a statement or question. It may be presented by machine or book, and some provision is made to indicate to the student the correctness of his responses.

Today, there are many different devices for teaching, ranging from simple programmed books to computer-operated systems which not only respond to student answers, but correct them when necessary. Ideally, a teaching machine should present instructional content to the student, require some means of student response or interaction, and offer immediate feedback to the student information as to the correctness of his responses. Some systems also provide alternate routes through the program, such routes determined by the student's responses.

Most commercial systems or devices are expensive, and require the user to purchase commercially prepared software or programs; e.g., tape cassettes, microfilm, carriers, etc.. Often programs desired are not commercially or readily available for the system or device. Few systems provide an acceptable means by which the user, a student or teacher, may prepare his own materials.

Teaching devices are not absolutely necessary for program presentation, although such devices do offer certain distinct advantages over book-type programs: cheating is less likely; the element of novelty may contribute to student interest; psychologically, devices differ from books, and thus, the use of a device may reduce student anxiety; and further, devices provide an opportunity for supervised, forced student concentration.

Thus, a need exists for a visual teaching device and system described herein which has the advantages of low cost, great flexibility of use and provision for instructor-prepared materials.

SUMMARY OF THE INVENTION

My invention concerns a teaching device and teaching system and a method of displaying instructional material and of instructing students by a programmed teaching method. In particular, my invention relates to a visual teaching device and a programmed teaching system employing such device, wherein instructional material prepared by the user or teacher may be displayed at any time on a screen in selected quadrant portions of the total image.

My visual teaching device provides for the display of only selected portions of a total projected image on a display screen to be observed by the student, so as to provide for the display of portions of the image in a desired teaching sequence. My device may be employed as a teaching device alone or in combination with a student response device which operates with the teaching device to control the teaching sequence and displays with the response provided by the student. My teaching device and system is relatively simple and economical to manufacture, and permits the use of instructional material prepared by the student or teacher.

My visual teaching device comprises in combination: a means to receive and to display an image, such as a screen; means to project an image containing instructional material, such as instructional material on a transparent slide, the image so projected to be directed through an optical system, all or a portion of the image to be displayed on the receiving screen means; and the optical system positioned between the image-receiving means and the means to project. The optical system comprises a first mirror means to receive an inverted reversed image from the means to project; means to rotate the first mirror means about an axis; a second mirror means to receive the image projected from the first mirror means, the second mirror means mounted at an angle on the optical path of the image projected from the projector means; means to rotate the second mirror means about an axis, preferably at 90° to the axis of the first mirror means, and a third mirror means to receive the image from the second mirror means, and to project the image so received onto the means to receive and display the image; that is, the projector screen; and control means to rotate the first and second mirror means so as to display on the image-receiving means only a selected portion, such as a quadrant portion, of the total image which is projected into the optical system, whereby instructional material from the total image on the slide may be displayed on the image-receiving means in a desired or controlled teaching sequence for viewing by the student.

BRIEF DESCRIPTION OF THE DRAWINGS

FIG. 5A is an illustrative view of the individual components of the response device of my system.

FIG. 5B is an exploded view of the components of the response device.

FIG. 5C is an assembled view of the components of the response device.

DESCRIPTION OF THE EMBODIMENTS

Figure 1:
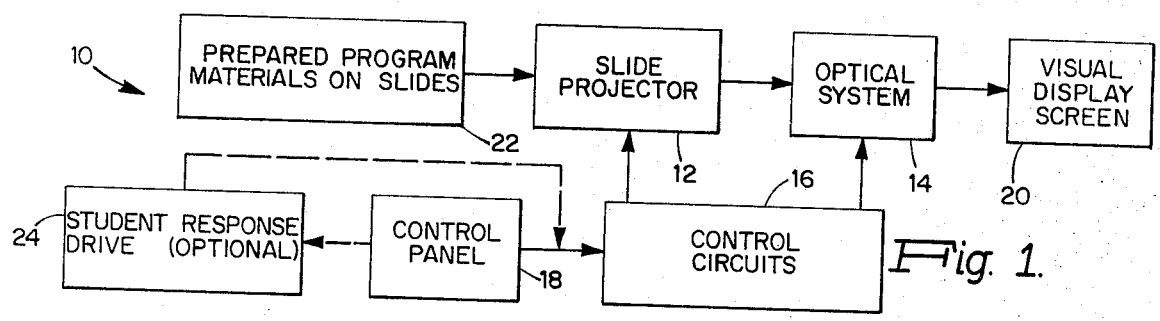
FIG. 1 is a schematic illustrative block diagram of my visual teaching device and system.

FIG. 1 is a schematic illustrative block diagram of my visual teaching system 10 which includes a slide projector 12, an optical system 14, a control circuit 16, a control panel 18 and a visual display screen 20, which, in combination, comprises my visual teaching device. Prepared programmed materials in one or more of a series of slide transparencies 22 are employed in my teaching device as illustrated, while a student response device 24, the use of which is optional in my teaching system, as set forth more fully in FIGS. 5A, 5B and 5C, is employed to provide student response to the teaching sequence when the student is using my visual teaching device.

Figure 2:
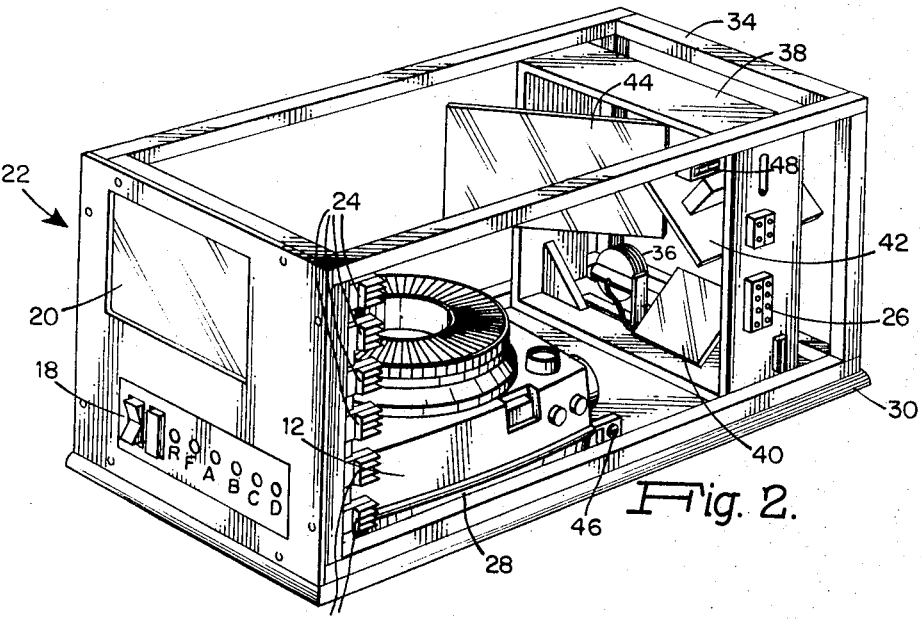
FIG. 2 is a perspective view of my assembled visual teaching device.

FIG. 2 is a perspective view of my assembled visual teaching device with the sides and top removed, and illustrating the components of my visual teaching device as assembled. My teaching device, as illustrated in FIG. 2, includes a base 30 supporting a frame 34, and a mirror support frame 38 (see FIG. 3) and a front panel 32 which includes the visual display screen 20 and a control panel 18. Within the frame 34 are positioned the slide projector 12, such as a commercially sold transparent slide projector like a Kodak Carousel projector, and components of the control circuit 16 which comprise, as illustrated, power cord reel 36, relays 24, wiring harness 28 and a solenoid 48 for adjustable first surface mirror 40 (see FIG. 3) and a vertical alignment adjustment control 46 for the projector 12.

Figure 3:
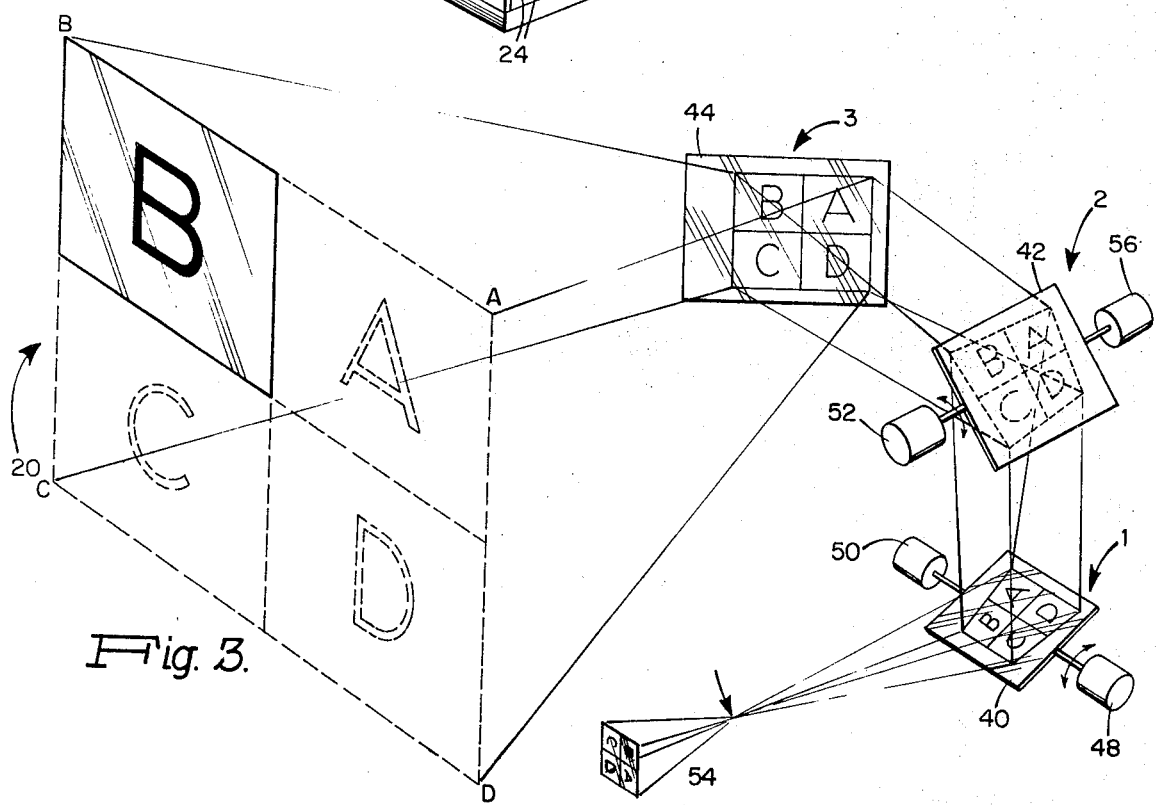
FIG. 3 is a perspective schematic view of the optical path system of my visual teaching device.

FIG. 3 is a perspective schematic view of the optical path system of my visual teaching device. The optical path shown is from the 35 mm transparent slide in the projector 12 through the display of one of the quadrants B on the display screen 20. The optical system then includes a transparent slide containing the total instructional material to be displayed on the screen 20, the slide, when placed in the projector 12, providing an image in the focal plane of the projector lens.

My optical system includes a first plane front surface mirror 40 adapted to receive an inverted reversed image from the slide 54 from the projector 12, the first mirror being mounted at an angle of about 45° from the horizontal axis which is at right angles to the optical path of the projector 12. The first mirror 40 is variable about its horizontal axis at a right angle to the optical path of the projector through the use of opposing electromechanical solenoids 48 and 50, and which opposing solenoids operate through relays from the control panel 18 in the teaching device.

My optical system also includes a second plane front surface mirror 42 which is positioned to receive the image from the first mirror 40, the second mirror being mounted at an angle of approximately 45° on a horizontal axis parallel to the optical path of the image from the projector. The second mirror 42 is larger than the first mirror 40, and like the first mirror is variable about a 45° position on a horizontal axis which is parallel to the image path from the projector. The second mirror is varied by means of opposing electromechanical solenoids 56 and 52 which control the movement of the mirror.

The optical path system also includes a fixed plane front surface mirror 44 larger than the second mirror 42 adapted to receive the image from the second mirror 42 and to project the image so received, or a quadrant portion thereof, onto the display screen 20. In the optical system, any projector of suitable dimensions and fitted with a short focal length lens may be employed in my teaching device, but a projector with remote forward and reverse operation is preferred.

In connection with my optical path system, instructional material for a teaching program is prepared and arranged in sets of four frames of quadrants; for example, of approximately 5 × 7 ½ inches, the size of which is variable depending upon the copy equipment employed. The material is then processed into suitable transparent slides, such as 2 × 2 inch slides. The particular arrangement of the instructional material depends upon the design of the teaching program to be employed in my system. One logical sequence in the teaching program is to use each slide quadrant A as illustrated for the main line of the program, and to employ subsequent quadrants B, C and D for branching and/or testing sequences. Employed with my response device (see FIGS. 5A, 5B and 5C), my teaching device may be locked against forward slide change until a correct response is made by the student to a question, such as a question possibly contained in quadrant D.

In the optical path system illustrated through the use of slide containing quadrants A, B, C and D, the display of only quadrant B of the slide is illustrated. In operation, the image of the four quadrants of the slide 54 is reversed by the projector lens 12 and the image projected onto the surface of the first mirror 40. The mirror 40 is a first surface mirror which is mounted about its axis as illustrated by the activation of the solenoids 50 and 48, whereby motion of the mirror 40 controls the horizontal shift of the image frame. For example, boundary C–D of the image would move toward the left of the device when mirror 40 is tilted forward.

Mirror 42 receives the image from mirror 40, and its position is controlled by means of opposing solenoids 52 and 56 which, as the other solenoids, are operated through relays from the control panel 18, so that motion of the mirror 42 controls the shift of the image in the vertical direction. Rotation of mirror 42 about its axis clockwise; that is, facing the device front as illustrated in FIG. 2, causes the boundary line of the image A–D to move upwardly.

The clockwise rotation of second mirror 42 brings either quadrant C or D onto the viewing display screen 20, depending upon the accompanying position of the variable mirror 40. Thus, in operation, through altering the positions of mirrors 40 and 42 about their respective axes through the use of the solenoids, any one of the four quadrants A, B, C or D in the 35 mm slide contained in the projector 12 may be displayed on the display screen 20 and viewed by the student, while the shift from one to the other quadrant is easily and rapidly accomplished; for example, in less than 2 seconds.

Mirror 44 is a fixed first surface mirror, but is adjustable (not shown) for minor image alignment, while each movable mirror 40 and 42 is also readjustable (not shown) for the desired alignment of the image received by each mirror.

In operation of my teaching device, the image displayed on the display screen 20 on the front panel 32 of my teaching device originates typically in a 35 mm transparency slide and is placed within the slide insert of the projector 12, such as a Kodak Carousel projector fitted with a three-inch focal length lens. The projector 12 operates the reverse R and forward F modes by means of switches mounted on the control panel 18. The image displayed on the screen 20 represents one quarter of the slide as illustrated, the slide being divided into quadrants.

Typically, quadrant A may be used for the main line of material for a teaching sequence, and is preferably the quadrant automatically displayed whenever the forward or reverse mode switches are activated. However, this feature (automatic display of quadrant A) is optional, and may be by-passed by means of an internal switch if desired. The instructional material contained with the quadrants B, C and D of slide 54 may be used for parallel material, review or adjunct material, for testing, or may be used as part of the main sequence material. The quadrants are selected for viewing by the student or the teacher by activation of one of the four quadrant switches which are labeled A, B, C and D on the control panel 32, or if desired, the switches can be activated in a predetermined time sequence through the use of a suitable timer.

Material for my teaching device is prepared on sheet material, such as cards, having a dimension of approximately the same size as the display screen 20, and then photograped, with, of course, the actual arrangement and dimensions variable depending upon the type of copy equipment used. The particular arrangement of the material and the order in which the quadrants are to be viewed by the student or teacher depend upon the design of the instructional program, and the capacity of the slide tray employed in the particular projector. Instructional material may be typed, drawn, pasted or written or otherwise illustrated, and may be photographed in color or black and white as desired.

The projector 12 is wired through plug-in-type connectors through the control panel 32. The projector is then aligned into the optical path system, with horizontal alignment being made by means of a vertical elevation control on the projector base, while a vertical alignment is made by motion of the projector about a vertical axis by means of its rotating support platform which is controlled by an adjustment control 46 on the projector support platform. The projector 12 is positioned on the platform base 30, with the projector feet resting in indentations to maintain the projector position.

In operation, the student or teacher operates the switches on the control panel 18, such as switches A, B, C and D, in the particularly desired sequence to energize relays which activate the solenoids which in turn operate the solenoids in proper combination so as to tilt the movable mirrors about their respective axes 40 and 42 as described to provide for selection of any one of the four quadrants to place their images onto the display screen 20. Operating the slide change switches in either the forward or reverse mode as shown automatically shifts the mirrors in the optical system to display the first qaudrant A, but this is an optional feature, and may be switched off by means of an internal control.

Figure 4:
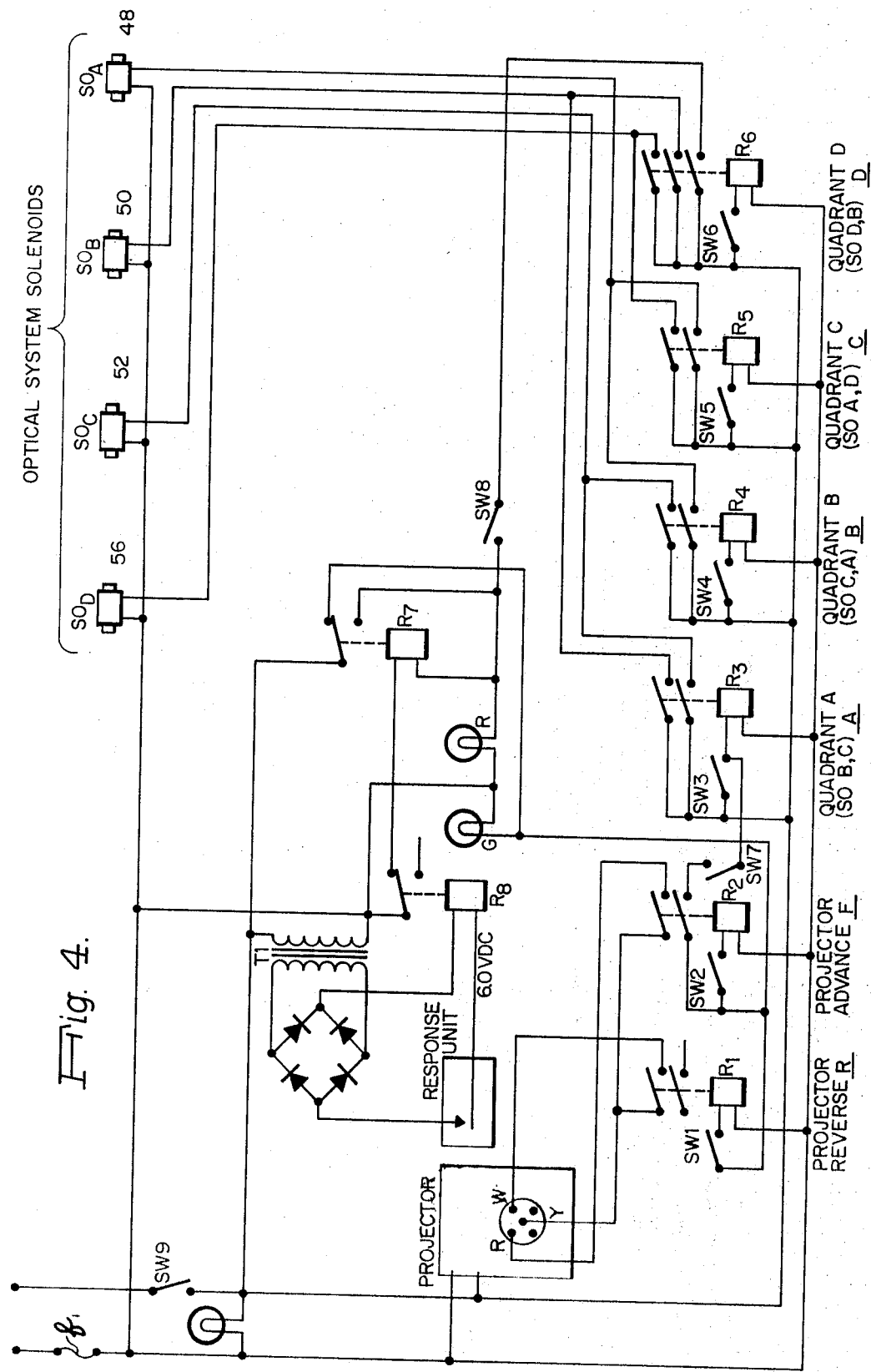
FIG. 4 is a schematic illustration of the electrical circuit of my visual teaching device.

FIG. 4 is a schematic diagram of the electrical circuit of my visual teaching device. Power is provided for the machine from a conventional 110–120 volt 60 A.C. outlet through a power cord disposed on a reel 36, which cord terminates at a terminal block within the device. One side of the line is fused (see FIG. 4, $f_1$), the other is switched by means of a s.p.s.t. switch ($sw_9$). A neon indicator signals when the electrical power is on. The projector 12 is left in the on position so that it is on when the power switch is closed. The six s.p.s.t. momentary contact switches ($sw_1$–$sw_6$) located on the front panel of the teaching device control all functions of the machine in association with their respective relays $R_1$–$R_6$. $Sw_1$ (projector reverse) indicated as R activates relay $R_1$, connecting the leads from the remote control cable connector of the projector (terminals 1 and 5, Kodak Carousel model 650H), thus causing it to change slides in the reverse direction.

Any quadrant of the slides may be displayed, depending upon the last quadrant selection. $Sw_2$ is the projector slide advance indicated as F, and through its relay $R_2$, connects the leads of the remote control cable (terminals 2 and 5), causing normal slide change in the forward direction. Simultaneously, relay $R_2$ also activates relay $R_3$ which sets the optical system for display of quadrant A automatically each time a slide is changed. This feature is optional and may be switched off by opening switch $s_7$ which is located inside the machine on the access door. $Sw_3$ is the quadrant A switch, and operates $R_3$ and energizes solenoid B (mirror number 1 to the forward position, ccw facing the right side of the device as shown in FIG. 2), and solenoid C (mirror number 2 downward, or ccw facing front of the device). $Sw_4$ is the quadrant B switch and operates relay $R_4$ which energizes solenoid C and solenoid A (mirror number 1 to backward position or cw from right side of the machine). $Sw_5$ is the quadrant C switch, operating relay $R_5$ and solenoids A and D (mirror number 2 upward position or cw from front of machine). $Sw_6$ is the quadrant D switch, and energizes solenoids D and B through relay $R_6$. In addition to operating the solenoids for quadrant D, relay $R_6$ may also energize relay $R_7$ when quadrant D is selected (this is an optional feature controlled through $sw_8$ located inside the device on the access door).

Relay $R_7$ is a holding relay, and once energized, will not release until relay $R_8$ interrupts the other side of its supply. Relay $R_7$ is used when my response device is being used and functions to cut off supply to relays $R_1$ and $R_2$ which control slide change. Thus, if this feature is being used, once quadrant D is selected (this quadrant would contain a multiple-choice question, or would be the last quadrant observed before slide change if the questions were contained on a sheet), slides cannot be changed (through quadrants A–D could be reviewed) until relay $R_8$ is energized. This function is accomplished through a low-voltage circuit that is completed by the probe of the response unit when the correct answer to the multiple-choice question is selected. The probe can make contact with the backing plate only through a hole in the Correct Answer Template (see FIGS. 5A, 5B and 5C). When contact is made, relay $R_8$ is energized, breaking the circuit to relay $R_7$ and causing it to release and restore operation of slide change switches $sw_1$ and $sw_2$. When a wrong answer is punched with the probe, a hole is left in the answer sheet, thus indicating a wrong choice or wrong choices. Selections are made until the red indicator light goes out (it comes on when quadrant D is selected and a response is to be made), and the green light glows, indicating that a correct response has been made and that the program may be continued.

The response device circuit incorporating a low-voltage circuit, relays $R_7$ and $R_8$ and one contact of relay $R_6$ may be by-passed merely by opening $sw_8$, in which case, all functions may be selected at any time desired without interruption.

Optionally, a response device 70 as shown more particularly in FIGS. 5A, 5B and 5C may be employed in combination with my visual teaching device.

In use, my response device 70, as shown more particularly in the assembled condition of FIG. 5C, is connected with the teaching device, the teaching device set for its use through the operation of an internal switch $sw_8$ (see FIG. 4). For example, quadrant D of each slide may be a multiple-choice question to test the student on the information previously displayed in quadrants A, B and C, or if desired, the questions can be contained in a booklet or sheet to follow the teaching program sequence displayed, thus, conserving viewing space on the teaching device. In either case and as an illustrative example, once quadrant D has been selected for posing the questions to the student, a response is required by the student before the sequence or the further display of quadrants in my teaching device can be continued.

FIGS. 5A, 5B and 5C are views of my response device 70 which consists of a base 68, a frame 66, such as, for example, a hinged locking frame approximately 6¾ inches by 9¾ inches. The frame 66 and base 68 are adapted to hold four sheet elements to comprise, and as illustrated more particularly in FIG. 5A, a multiple-choice answer sheet 58, an answer sheet support 60, a correct answer template 62 and an electrical conductive surface sheet 64. The answer sheet 58 is illustrated as containing space for thirty responses by the student. The answer support sheet 60 has the answer choices punched out so that holes from the answer template will not show through, so that the answer sheet 60 is raised so that holes may be punched therethrough easily by the student. The correct answer template 62 is composed of a nonconductive material, such as an answer sheet, with correct answer choices punched out. The punch out holes provide means by which a marking stylus 74 can reach the conducting surface of the conductive surface sheet 64, so as to complete the low-voltage circuit providing for tripping the teaching device and permitting the slide to advance to the next quadrant, thereby indicating the correct choice by the student which may also be indicated by a visual signal, such as a green light.

The answer sheets 58 are mimeographed or printed, and consist of half sheets of standard 8½ × 11 paper (two answer sheets are printed per page, then cut). They provide four choices per question (A,B,C,D), and contain space for 30 responses. The response spaces are so arranged on the sheet that the Answer Template may be turned over and inverted to change correct answer locations for questions 31–60, 61–90 and 91–120 without having to make additional templates. Each time a student completes a 30 question sheet, the response device 70 is unplugged and returned to the instructor for examination and reloading. A low-voltage circuit (6 v. D.C.) is used for the response device in order to eliminate electrical hazards.

My response device provides a means by which a student may check his understanding of the material presented by the visual teaching device, and to provide immediate feedback as to the correctness of the responses selected by the student to, for example, questions proposed in any one of the quadrants on the display screen, such as responses to multiple-choice questions displayed. My response device also provides a means by which the instructor is provided with a record of student responses which permits the instructor to acquire knowledge as to areas in which the student has been trained or is unfamiliar. My response device used in combination with my teaching device also serves to force concentrated attention to the programs being displayed, since it requires student interaction with the displays on the visual teaching device. Of course, my visual teaching device may be used alone or in combination with other known response devices, and my teaching device may be employed in combination with timing means so as to provide for the sequential or predetermined time displays of the particular quadrants of the slide in the projector, thereby providing a measure of the student's knowledge by his rapid response to instructional material so displayed.

What I claim is:

1. A visual teaching device, which device comprises in combination:
   a. an image-receiving and display means;
   b. a means to project an image onto the display means through an optical system;
   c. an optical system between the display means and the means to project comprising:
      i. a first plane front surface mirror adapted to receive the projected image, the first mirror mounted at an angle of about 45° from the horizontal on an axis which is at right angles to the optical path of the projected image;
      ii. a first means to rotate the first mirror about its axis;
      iii. a second plane front surface mirror adapted to receive the image from the first mirror, the second mirror mounted at an angle of about 45° from the vertical on an axis parallel to the optical path of the projected image from the means to project;
      iv. a second means to rotate the second mirror about its axis;
      v. a fixed plane front surface mirror adapted to receive the image from the second mirror and to project the image onto the display means; and
   d. control means to control the first and second means to rotate the first and second mirrors so as to project at any time onto the display means a selected quadrant portion of the image from the image projected for teaching purposes.

2. The device of claim 1 wherein the first and second means to rotate the first and second mirrors are electromechanical solenoids.

3. The device of claim 1 wherein the means to project comprises a projector having a short focal length lens, and adapted to project an inverted reversed image onto the first mirror.

4. The device of claim 3 wherein the projector is adapted to receive and project an image from a transparent slide containing instructional material in quadrant portions of the slide.

5. The device of claim 1 wherein the means to display the image is a flat display screen, and which device includes as the control means four control switches, the activation of each switch providing the display on the screen of a selected quadrant of the projected image.

6. The device of claim 5 wherein the screen and control switches are positioned in a control panel for viewing by the user.

7. The device of claim 1 wherein the first, second and fixed mirrors are each progressively larger in image-receiving surface from the preceding mirror.

8. A teaching system which comprises in combination:
 a. the teaching device of claim 1; and
 b. a response means adapted to be employed by the user to respond to information displayed as an image on the display means, and to prevent the display of the next sequential image, unless a correct response is made in the response unit, the response means in electrical communication with the electrical circuit of the control means.

9. The teaching system of claim 8 wherein the response means comprises in combination:
 a. a base element;
 b. an answer sheet with choices of multiple answers displayed thereon for selection by the user;
 c. an answer support sheet with perforations thereon corresponding to all the choices of the answer sheet;
 d. a nonconductive correct answer template sheet with perforations therein corresponding to the position of the correct answer on the answer sheet;
 e. a sheet having an electrically conductive surface;
 f. a signal cable electrically connecting the sheet with the conductive surface with the teaching device control means;
 g. a marking stylus, one end of which is electrically connected to part of the circuit, the other stylus end for use by the user for insertion in selected responses in the answer sheet;
 h. a frame element, the base and frame element matingly engaged to enclose and retain the sheet materials in an assembled condition; and
 i. means to advance the quadrant image displayed on selection of the proper response by the user when the stylus is inserted in the correct response perforation to complete the electrical circuit.

10. A visual teaching device, which device comprises in combination:
 a. an image-receiving screen;
 b. a projector to display an image on a slide onto the screen, the projector having a short focal length lens and having means to receive a slide containing the image to be displayed on the screen;
 c. an optical system between the screen and the projector comprising:
  i. a first plane front surface mirror to receive an inverted reversed image of the slide from the projector, the first mirror mounted at an angle of about 45° from the horizontal on a horizontal axis which is at right angles to the optical path of the projector;
  ii. first solenoid means to rotate the first mirror about its horizontal axis;
  iii. a second plane front surface mirror to receive the image from the first mirror, the second mirror mounted at an angle of approximately 45° from the vertical on a horizontal axis parallel to the optical path of the image from the projector;
  iv. second solenoid means to rotate the second mirror about its vertical axis;
  v. a fixed plane front surface mirror to receive the image from the second mirror and to project the image so received onto the screen, the first, second and fixed mirrors each having a progressively larger surface area to receive the image; and
 d. control means to control the rotation of the first and second mirrors so as to display at a time on the screen only a selected quadrant portion of the image from the projector for teaching purposes.

11. A teaching system which comprises in combination:
 a. the teaching device of claim 10;
 b. a response means to permit the user to select responses related to information or questions displayed on the teaching device, the response means electrically communicating with the control means; and
 c. an electrical control means to prevent the advance of the guadrant displayed on the teaching device until a correct response is selected by the user and entered into the response means.

12. A method of operating a teaching device, which method comprises:
 a. providing a slide for display containing four separate quadrant display image areas on the slide;
 b. placing the slide in a projecting means;
 c. projectng the total image of the slide onto an optical system containing a series of plane front surface mirrors, the mirrors directing the image displayed onto a screen a quadrant at a time;
 d. adjusting the mirrors in the optical path of the displayed image by rotating at least one mirror about one axis and another mirror about another axis at right angles to the one axis; and
 e. controlling the adjustment of the mirrors so as to display on the screen only a selected quadrant portion of the slide in the projector.

13. The method of claim 12 which includes adjusting the mirrors by employing an electromechanical system of solenoids.

14. The method of claim 13 wherein the mirrors in the optical path from the projected image include sequentially a first variable mirror, a second variable mirror and a fixed mirror.

15. A teaching system which comprises:
 a. displaying in a programmed sequence quadrant portions of an image as claimed in claim 12;
 b. providing for the user to select responses relative to the information displayed in any quadrant at any one time;
 c. preventing the display of the next sequential quadrant, unless the user selects a proper response; and
 d. providing for the display of the next sequential display on selection of the correct response by the user.

* * * * *

UNITED STATES PATENT OFFICE
CERTIFICATE OF CORRECTION

Patent No. 3,838,525           Dated October 1, 1974

Inventor(s)  David A. Harvey

It is certified that error appears in the above-identified patent and that said Letters Patent are hereby corrected as shown below:

In the title page, item [76], the inventor's address should be amended to read:

--Smead Hill Road,
  Shelburne, Mass. 01340--

Signed and sealed this 31st day of December 1974.

(SEAL)
Attest:

McCOY M. GIBSON JR.          C. MARSHALL DANN
Attesting Officer            Commissioner of Patents